(12) United States Patent
Huang

(10) Patent No.: US 12,507,890 B2
(45) Date of Patent: Dec. 30, 2025

(54) METHOD OF IDENTIFYING IRIS

(71) Applicant: PIXART IMAGING INC., Hsin-Chu (TW)

(72) Inventor: Yu-Hao Huang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 18/319,436

(22) Filed: May 17, 2023

(65) Prior Publication Data

US 2023/0293007 A1 Sep. 21, 2023

Related U.S. Application Data

(63) Continuation of application No. 16/679,421, filed on Nov. 11, 2019, now abandoned, which is a (Continued)

(30) Foreign Application Priority Data

Nov. 14, 2013 (TW) ................................. 102141440

(51) Int. Cl.
*A61B 3/00* (2006.01)
*A61B 3/113* (2006.01)
(Continued)

(52) U.S. Cl.
CPC .......... *A61B 3/1216* (2013.01); *A61B 3/0025* (2013.01); *A61B 3/113* (2013.01); *A61B 3/14* (2013.01)

(58) Field of Classification Search
CPC ... G02B 27/0093; G06F 3/013; A61B 3/0025; A61B 3/11; A61B 3/113; A61B 3/14; (Continued)

(56) References Cited

U.S. PATENT DOCUMENTS 8,872,910 B1 * 10/2014 Vaziri ................... H04N 23/57
348/78
8,913,789 B1 * 12/2014 Starner .................. G01S 17/06
382/103
(Continued)

FOREIGN PATENT DOCUMENTS

CN 101344919 A 1/2009
CN 101539991 A 9/2009

*Primary Examiner* — Marin Pichler
(74) *Attorney, Agent, or Firm* — Li & Cai Intellectual Property (USA) Office

(57) ABSTRACT

A method of identifying an iris includes: providing incident beams entering an eye locating at a reference position; setting a first, a second and a third reference point for locating the eye at the reference position; forming a first, a second and a third measuring glint by the incident beams after the eye moves from the reference position to a measuring position, and positions of the first, the second and the third measuring glint corresponding to the positions of the first, the second and the third reference point; capturing an eye image including a first, a second, a third measuring glint image and an iris image; comparing the gray scale value with a threshold gray scale value to obtain the positions of the first, the second and the third measuring glint; and calculating a first and a second variation to obtain an resolution variation of the iris image.

5 Claims, 11 Drawing Sheets

Related U.S. Application Data continuation of application No. 15/588,473, filed on May 5, 2017, now abandoned, which is a continuation of application No. 14/478,517, filed on Sep. 5, 2014, now abandoned.

(51) Int. Cl.
*A61B 3/12* (2006.01)
*A61B 3/14* (2006.01)

(58) Field of Classification Search
CPC ............... A61B 3/145; A61B 3/1216; A61F 2009/00846
USPC ............................................. 359/206, 246
See application file for complete search history.

(56) References Cited

U.S. PATENT DOCUMENTS

| | | | |
|---|---|---|---|
| 2011/0019874 A1* | 1/2011 | Jarvenpaa | A61B 3/113 382/103 |
| 2011/0109880 A1* | 5/2011 | Nummela | G02B 27/0081 351/210 |

* cited by examiner

METHOD OF IDENTIFYING IRIS

CROSS REFERENCE TO RELATED APPLICATION

This application is a continuation application of U.S. application Ser. No. 16/679,421, filed on Nov. 11, 2019, and entitled "METHOD OF IDENTIFYING IRIS", which is a continuation application of U.S. application Ser. No. 15/588,473, filed on May 5, 2017, and entitled "METHOD OF IDENTIFYING IRIS", which is a continuation application of U.S. application Ser. No. 14/478,517, filed on Sep. 5, 2014, and entitled "EYE DETECTING DEVICE AND METHODS OF DETECTING PUPIL", the entire contents of which are hereby incorporated by reference.

BACKGROUND

1. Technical Field

The present disclosure relates to an eye detecting device, in particular an eye detecting device for detecting pupil and identifying iris.

2. Description of Related Art

Currently, the eye detecting device can be used to detect gaze direction or identify iris boundary. Most eye detecting devices detects the eye gaze direction by using the characteristic that the position of pupil changes with the gaze direction.

Generally, conventional eye detecting device detects the eye gaze direction by using the glint formed by emitting the incident light into the eye, and the glint is used to be a reference point for locating eye.

Specifically, after capturing eye image, the conventional eye detecting device identifies the pupil and glint from the whole cornea image. In the process of identifying the pupil, the conventional eye detecting device scans whole eye image. The conventional eye detecting device analyzes the gray scale value distribution of whole eye image for identifying the pupil and glint. The conventional eye detecting device can obtain the relative position of the pupil and glint, and then determines the gaze direction according to the relative position.

SUMMARY

An exemplary embodiment of the present disclosure illustrates an eye detecting device which determines the position of the pupil according to at least one glint.

An exemplary embodiment of the present disclosure illustrates a method of identifying iris includes: providing, by an optical assembly, a plurality of different incident beams entering an eye, the eye locating at a reference position, wherein the optical assembly includes only one single light source and only one light dispersing component, and the only single light source is configured to generate light entering into the only one light dispersing component so that the light is divided into the plurality of incident beams entering the eye by the light dispersing component; setting a first reference point, a second reference point and a third reference point as a mark for locating the eye at the reference position, wherein positions of the first reference point, the second reference point and the third reference point are corresponding to emission positions of the incident beams; forming a first measuring glint, a second measuring glint, and a third measuring glint near a pupil of the eye by the incident beams after the eye moves from the reference position to a measuring position, and a plurality of positions of the first measuring glint, the second measuring glint, and the third measuring glint are corresponding to the positions of the first reference point, the second reference point and the third reference point; capturing an eye image of the eye including a first measuring glint image, a second measuring glint image, a third measuring glint image, and an iris image; analyzing a gray scale value of the eye image by comparing the gray scale value with a threshold gray scale value through an arithmetic unit to obtain the positions of the first measuring glint, the second measuring glint, and the third measuring glint; and calculating a first variation of a first line defined by the first measuring glint and the second measuring glint with respect to a first reference line defined by the first reference point and the second reference point, and calculating a second variation of a second line defined by the second measuring glint and the third measuring glint with respect to a second reference line defined by the second reference point and the third reference point, so as to obtain an resolution variation of the iris image when the eye is located at the measuring position.

An exemplary embodiment of the present disclosure illustrates a method of detecting pupil which determines the position of the pupil according to one glint or plurality of glints.

An exemplary embodiment of the present disclosure illustrates a method of detecting pupil including providing at least one incident light entering an eye to form at least one first glint, and the first glint is located near a pupil of the eye. Capturing a first eye image including a glint image and a pupil image. Analyzing a gray scale value of the first eye image to obtain the distributions of the first glint. Determining a position of the pupil of the eye according to the distributions of the first glint.

An exemplary embodiment of the present disclosure illustrates a method of identifying iris which obtains a deformation amount of the iris image of the eye while the eye moving.

An exemplary embodiment of the present disclosure illustrates a method of identifying iris including when an eye is located at a reference position, providing a plurality of incident lights entering the eye to form a plurality of a first reference point, a second reference point and a third reference point located near a pupil of the eye as a mark for locating the eye at the reference position, wherein the positions of the first reference point, the second reference point and the third reference point are corresponding to the emission position of the incident lights. When the eye moves from the reference position to a measuring position, the incident lights form a first measuring glint, a second measuring glint, and a third measuring glint near a pupil of the eye. Capturing a eye image of the eye including a first measuring glint image, a second measuring image, a third measuring glint image, and an iris image. Analyzing a gray scale value of the eye image to obtain the positions of the first measuring glint, the second measuring, and the third measuring glint. Calculating a displacement amount of the first measuring glint, the second measuring glint, and the third measuring glint relative to the first reference point, the second reference point and the third reference point respectively, so as to obtain a deformation amount caused by the iris image of the eye at the measuring position relative to the iris image of the eye at the reference position.

An exemplary embodiment of the present disclosure illustrates a method of identifying iris which obtains a resolution variation of the iris image of the eye.

An exemplary embodiment of the present disclosure illustrates a method of identifying iris including providing a plurality of incident lights entering the eye. Setting a first reference point, a second reference point and a third reference point as a mark for locating the eye at the reference position, wherein the positions of the first reference point, the second reference point and the third reference point are corresponding to the emission position of the incident lights. The incident lights form a first measuring glint, a second measuring glint, and a third measuring glint near a pupil of the eye, and a plurality of positions of the first measuring glint, the second measuring glint, and the third measuring glint are corresponding to those positions of the first reference point, the second reference point and the third reference point. Capturing a eye image of the eye including the first measuring glint image, the second measuring image, the third measuring glint image, and an iris image. Analyzing a gray scale value of the eye image to obtain the positions of the first measuring glint, the second measuring glint, and the third measuring glint. Calculating a variation of the distance between the first measuring glint and the second measuring glint with respect to the distance between the first reference point and the second reference point, and calculating a variation of the distance between the second measuring glint and the third measuring glint with respect to the distance between the second reference point and the third reference point, so as to obtain an resolution variation of an iris image when the eye is located at the measuring position.

In summary, the present disclosure provides eye detecting device, methods of detecting pupil and identifying iris. The eye detecting device includes an optical assembly, an image sensor, and an arithmetic unit. The arithmetic unit can analyze the gray scale value distribution of the survey area near the arrangement of the glint in the first eye image so as to reduce searching scope of the pupil. Hence, the position of the pupil can be searched quickly. Therefore, compared with conventional technology, the arithmetic unit does not analyze the gray scale value distribution of whole first eye image for searching scope of the pupil.

The present disclosure provides A method of identifying iris includes: providing, by an optical assembly, a plurality of incident beams and forming a plurality of glints reflected by the incident beams; setting a first reference point, a second reference point and a third reference point as a mark for locating the eye at a reference position; forming a first measuring glint, a second measuring glint, and a third measuring glint near a pupil of the eye by the incident beams after the eye moves from the reference position to a measuring position; capturing an eye image of the eye including a first measuring glint image, a second measuring glint image, a third measuring glint image, and an iris image; analyzing a gray scale value of the eye image by comparing the gray scale value with a threshold gray scale value through an arithmetic unit to obtain the positions of the first measuring glint, the second measuring glint, and the third measuring glint; calculating a first variation of a first line defined by the first measuring glint and the second measuring glint with respect to a first reference line defined by the first reference point and the second reference point, and calculating a second variation of a second line defined by the second measuring glint and the third measuring glint with respect to a second reference line defined by the second reference point and the third reference point; and calculating an iris image deformation amount according to the first variation, the second variation and the third variation. The iris image deformation amount is caused by the iris image of the eye at the measuring position relative to the iris image of the eye at the reference position.

The arithmetic unit can calculate the major axis and minor axis of the said ellipse according to the first variation, the second variation, and the third variation. Hence, the boundary of the pupil P1 can be estimated so that the boundary of the pupil P1 can be searched quickly.

The present disclosure provides methods of identifying iris. The arithmetic unit can calculate the major axis and minor axis of the said ellipse according to the first, second, and third variation. Hence, the boundary of the pupil can be estimated so that the boundary of the pupil can be searched quickly.

The present disclosure provides methods of identifying iris. The arithmetic unit can calculate the first, second, and third variation. Hence, the boundary of the pupil can be estimated so that the boundary of the pupil can be searched quickly.

In order to further understand the techniques, means and effects of the present disclosure, the following detailed descriptions and appended drawings are hereby referred to, such that and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
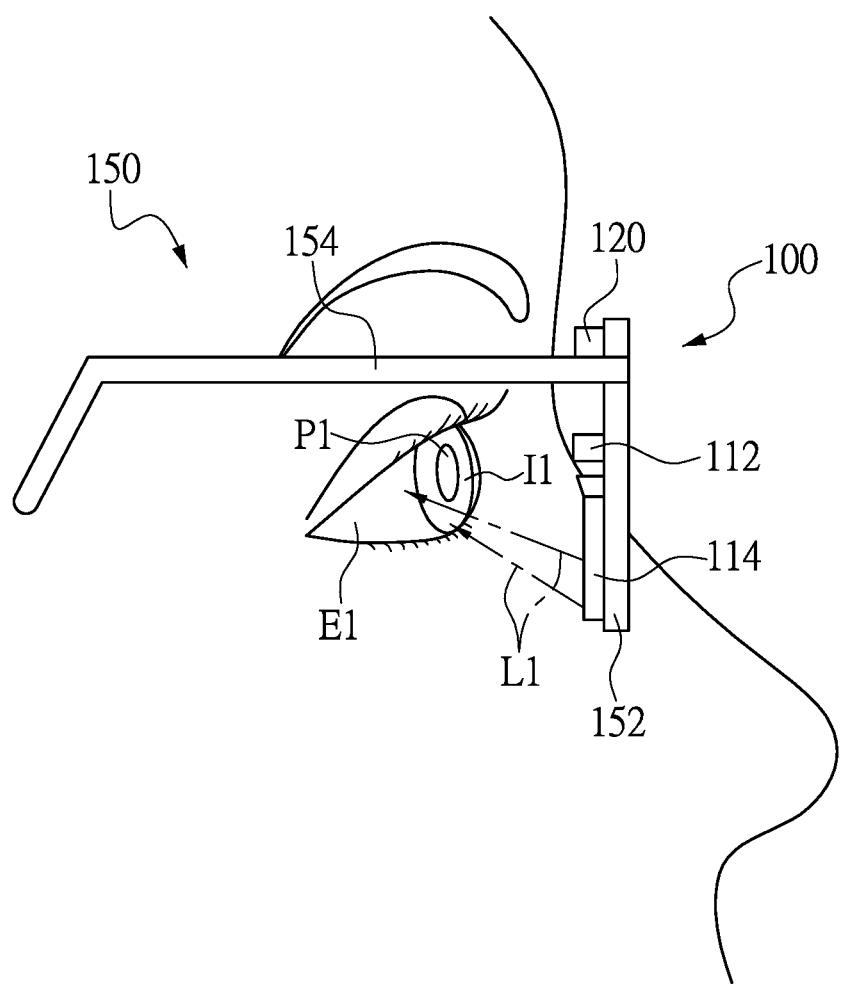
FIG. 1A depicts a side view of the eye detecting device in accordance with the first embodiment of the present invention.
Figure 1B:
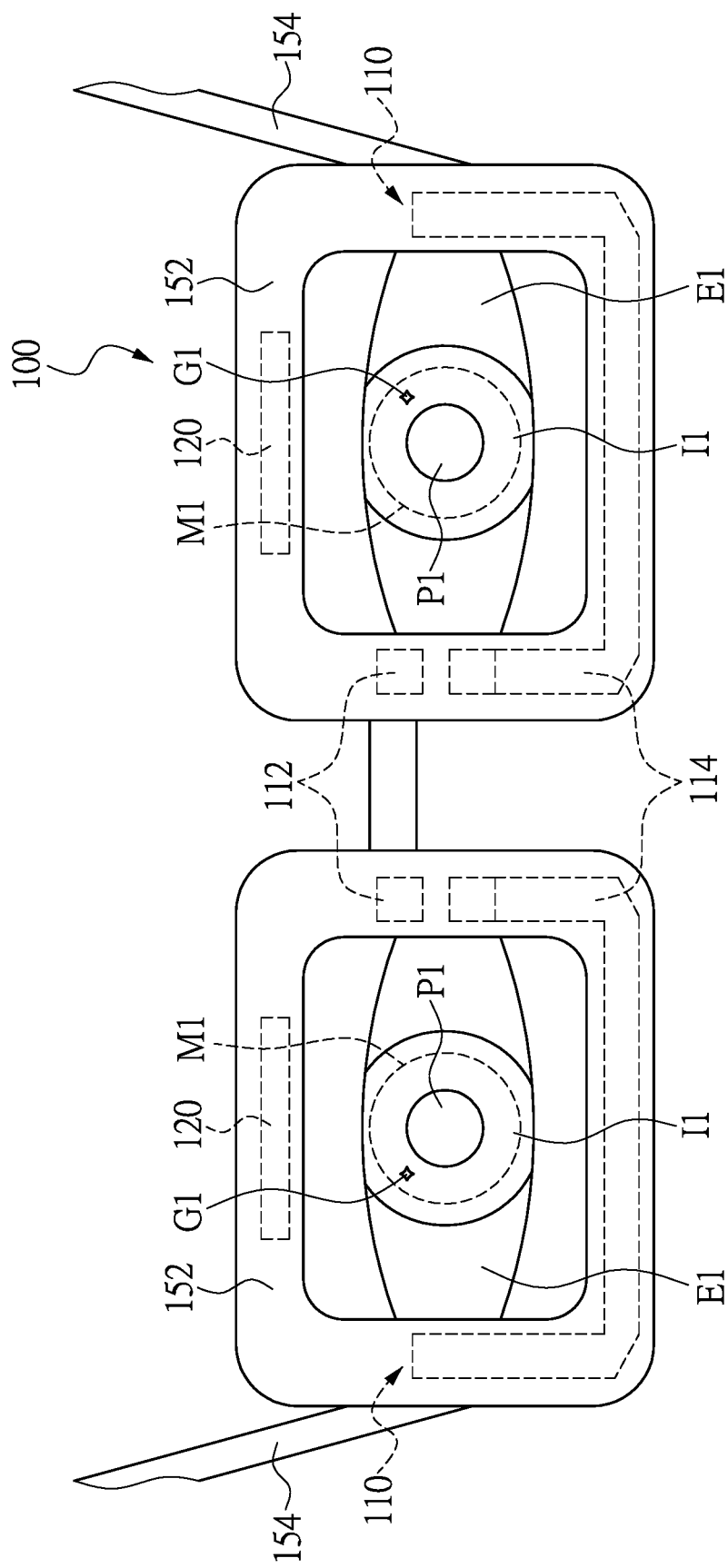
FIG. 1B is a front view of the eye detecting device shown in FIG. 1A.
Figure 1C:
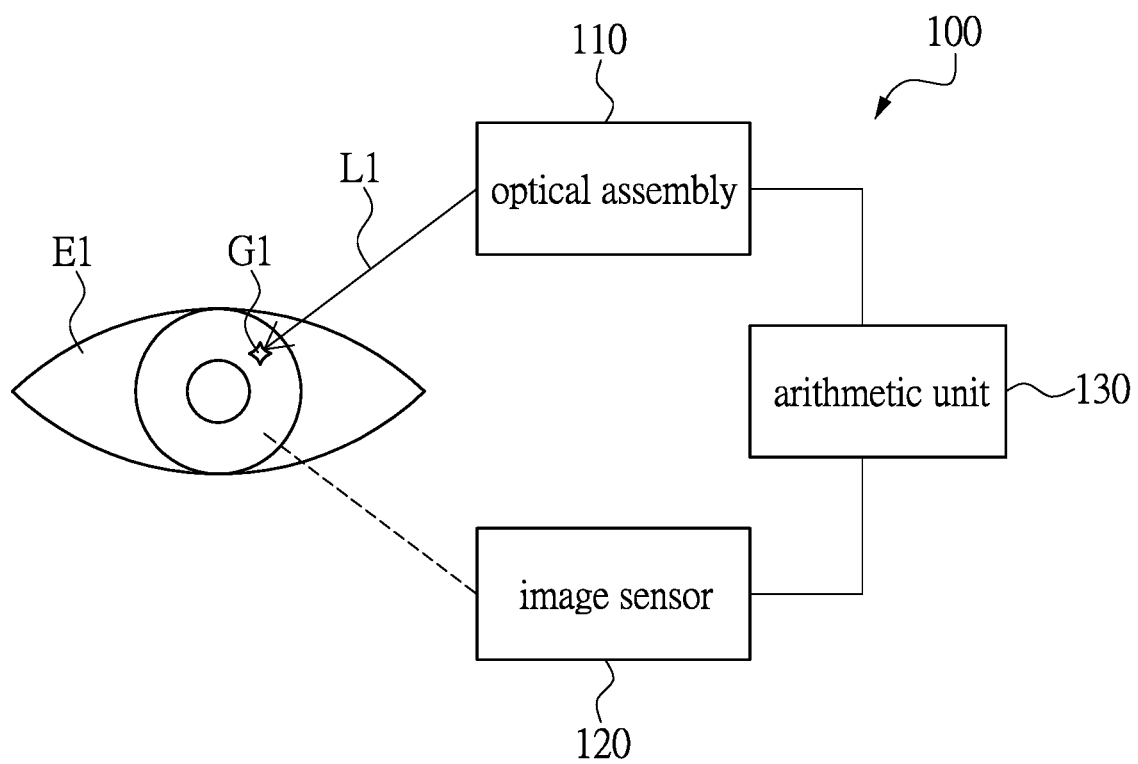
FIG. 1C is a function block diagram of the eye detecting device in accordance with the first embodiment of the present invention.

FIG. 1A is a side view of the eye detecting device in accordance with the first embodiment of the present invention. FIG. 1B is a front view of the eye detecting device shown in FIG. 1A. FIG. 1C is a function block diagram of the eye detecting device in accordance with the first embodiment of the present invention. Please refer to FIG. 1A to 1C, the eye detecting device 100 includes an optical assembly 110, an image sensor 120, and an arithmetic unit 130. The optical assembly 110 provides at least one incident light L1 to form at least one glint G1 located near a pupil P1 of the eye E1. Specifically, the eye E1 has the pupil P1 and a periphery surrounding the pupil P1, and the glint G1 is formed on the periphery. The periphery includes an iris I1 and a sclera. The image sensor 120 is used to capture an eye image, and the eye E1 image includes the glint G1 image. The arithmetic unit 130 analyzes a gray scale value of the eye E1 image and obtains at least one position of the glint G1 according to the gray scale value. Hence, the arithmetic unit 130 can determine the position of the pupil P1 of eye E1 according to the position of the glint G1.

The eye detecting device 100 can be disposed on the eyeglasses frame, and the eye detecting device 100 also can be disposed on the laptop or the screen of the smartphone. In this embodiment, the eye detecting device 100 may be wearable, like eyeglasses. The optical assembly 110 and the image sensor 120 are disposed on the supporting frame 150. A user can wear the supporting frame 150, and the optical assembly 110 and the image sensor 120 are in front of the user. However, in other embodiment, the eye detecting device 100 can be disposed on mobile device, for example, laptop, the front camera lens or the screen of the smartphone. However, the present disclosure does not limit the disposition of the eye detecting device 100.

Practically, the supporting frame 150 can be an eyeglasses frame. The supporting frame 150 includes two rims 152 and two temples 154 connected to rims 152 respectively. A user can put the temples 154 on ears, and the rims 152 are in front of the eye E1. However, the present disclosure does not limit the supporting frame 150.

The optical assembly 110 can emit at least one incident light L1 entering the eye E1. The incident light L1 falls on the eye E1 to form at least one glint by reflecting at the iris I1 of the eye E1. The glint is located near a pupil P1 of the eye E1. Specifically, the glint may be formed on the periphery surrounding the pupil P1, namely iris I1 or sclera. In this embodiment, providing one incident light L1 entering the eye E1 so that the number of the glint is one. It is worth to mention that the incident light L1 is the invisible light, such as infrared light or near infrared light. The cornea covered on the iris I1 has a smooth surface so that the incident light L1 emitted in many directions can form the glint G1 through the path between the cornea and the image sensor 120.

Specifically, the optical assembly 110 includes at least one light source 112 and at least one dispersing component 114 so that the optical assembly 110 provides at least one incident light L1. Practically, the light source 112 can be light emitting diode (LED), and the dispersing component 114 can guide light and has a plurality of optical microstructures. The optical microstructures can be optical microstructures, trenches or ribs. The trenches may be V-cut grooves. When the light provided by the light source 112 is emitted into the dispersing component 114, the light can be reflected, refracted, or scattered by the optical microstructures so as to be transmitted from an outgoing surface of the dispersing component 114.

The image sensor 120 is used to capture the eye E1 image. It is worth mentioning that the wavelength range of the light captured by the image sensor 120 covers the wavelength range of the incident light L1. The eye E1 image appears in the eye region of user, for example, the eye white area (not shown), the iris I1 area, and the pupil P1 area. Besides, the eye E1 image shows the glint G1 image. Specifically, the image sensor 120 senses the incident light L1 through photo-sensitive elements. The photo-sensitive elements can be complementary metal-oxide-semiconductor sensors (CMOS) or charge-coupled devices (CCD).

The arithmetic unit 130 can be a digital signal processor (DSP) or a central processing unit (CPU). The arithmetic unit 130 analyzes a gray scale value of the eye image and obtains the distribution of the glint G1 through the gray scale value. The arithmetic unit 130 determines the position of the pupil P1 of eye E1 according to at least one distribution of the glint G1.

Figure 1D:
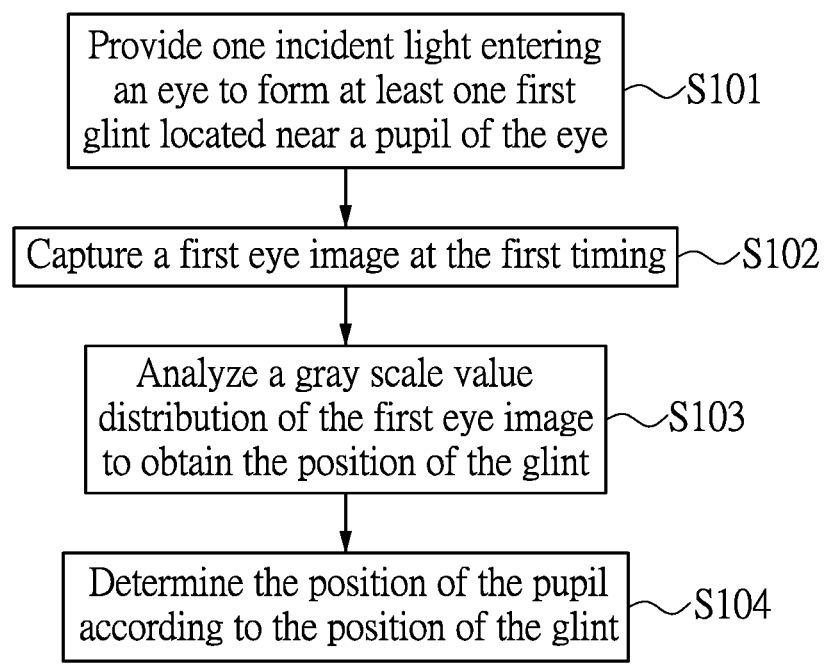
FIG. 1D depicts a flow diagram of a method of detecting pupil in accordance with the first exemplary embodiment of the present disclosure.

FIG. 1D depicts a flow diagram of a method of detecting a pupil in accordance with the first exemplary embodiment of the present disclosure. Please refer to FIG. 1B, FIG. 1C and FIG. 1D.

Implementing the step S101, when the user uses the eye detecting device 100, such as the user wearing the supporting frame 150 of the eye detecting device 100, the optical assembly 110 provides one incident light L1 entering into the eye E1. The incident light L1 is located at the eye E1 and reflects to form one glint G1 near the pupil P1, such as the iris I1.

It is worth to notice that the position where the incident light L1 enters the iris I1 near the pupil P1 can be adjusted by changing the arrangement of the light source 112 or the disposition of the light source 112 and the dispersing component 114. Namely, the position of the glint G1 can be changed by the emission position of the incident light L1. Hence, the position of the glint G1 depends on the emission position of the incident light L1.

Implementing the step S102, the image sensor 120 captures a first eye image by photographing the eye E1. The first eye image photographed by image sensor 120 shows the image of the eye E1 region and the image of the said glint G1. Then, the image sensor 120 transmits the data of the first eye image to the arithmetic unit 130.

Implementing the step S103, the arithmetic unit 130 analyzes a gray scale value of the first eye image to obtain the distributions of the glint G1. The 8-bit color image, namely 256-grayscale image is used as an example. The grayscale value is quantified as 256 colors from the pure black, through gray to white, and the grayscale value ranges from 0 to 255. It is worth to notice that the gray scale value of the glint G1 is near to or equal to 255, whereas the gray scale value of the pupil P1 is near to 0. The arithmetic unit 130 can obtain the arrangement, shape and range of the pixels which is close to the maximum gray scale value in all pixels through the gray scale value distribution of the first eye image. Further, the arithmetic unit 130 speculates the arrangement of the pixels corresponding to the arrangement of the glint G1 in the first image.

Implementing the step S104, the arithmetic unit 130 determines the position of the pupil P1 according to the position of the glint G1. Specifically, the arithmetic unit 130 selects an appropriate threshold gray scale value first. The gray scale value of the pupil P1 is less than the said threshold gray scale value, whereas the gray scale value of the glint G1 in the first eye image is greater than the said threshold gray scale value.

After confirming the position of the glint G1, the arithmetic unit 130 scans the survey area M1 near the arrangement of the glint G1 (shown in FIG. 1B), and analyzes the gray scale value distribution of the survey area M1. The arithmetic unit 130 determines the part of the survey area M1, whose gray scale value is less than the threshold gray scale value. The survey area M1 can be defined by at least one glint G1. The positions of the glint G1 and the pupil P1 are in the survey area M1. It is worth mentioning that the position of the glint G1 can be at the boundary of the survey area M1 or in the survey area M1. A user can set the range of the survey area M1 according to the pupil P1 size through the arithmetic unit 130. The present disclosure does not limit the range of the survey area M1.

The arithmetic unit 130 determines an area from the survey area M1 to be a specific area, and the gray scale value of the specific area is less than the threshold gray scale value. Further, the arithmetic unit 130 determines whether the shape of the specific area matches with the shape of the pupil P1 to reduce the possibility of the misjudgment of the pupil P1 position. For instance, the arithmetic unit 130 selects two specific areas satisfied by the condition that the gray scale value of the specific areas are less than the threshold gray scale value. When one specific area is rectangle, and the other specific area is circular, the arithmetic unit 130 then determines one of the circular specific areas, which is circular, matches with the shape of the pupil P1. Besides, in order to reduce the possibility of the misjudgment of the pupil P1 position more, user can set the range of the pupil P1 area in the first image. The arithmetic unit 130 determines whether the proportion of the specific area is within the range of the pupil P1 to reduce the possibility of the misjudgment of the pupil P1 position more.

It is worth mentioning that the arithmetic unit 130 can analyze the gray scale value distribution of the survey area M1 near the glint G1 in the first eye image so as to reduce searching scope of the pupil P1. Hence, the position of the pupil P1 can be found quickly. Therefore, compared with conventional technology, the arithmetic unit 130 does not analyze the gray scale value distribution of whole first eye image for searching for the pupil P1.

Figure 2A:
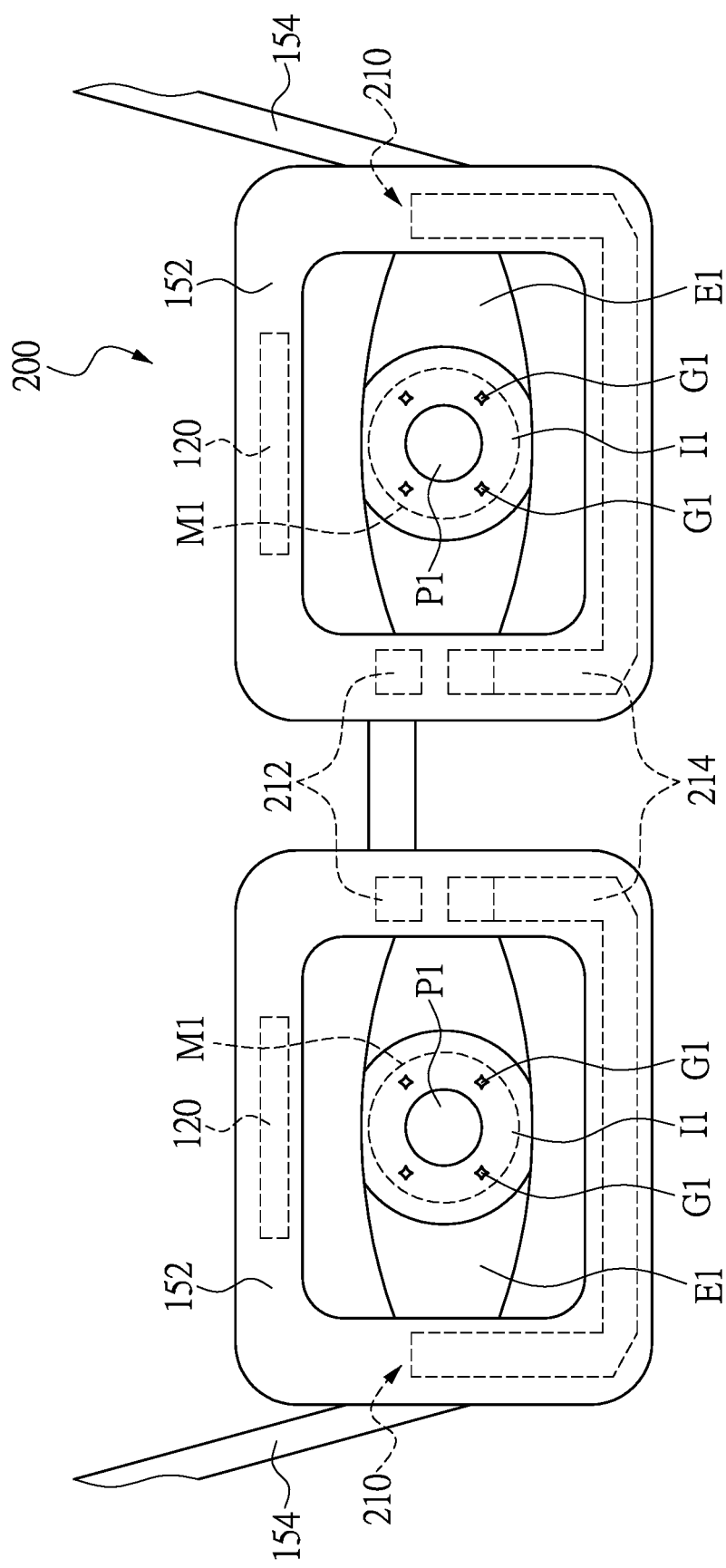
FIG. 2A depicts a side view of the eye detecting device in accordance with the second embodiment of the present invention.
Figure 2B:
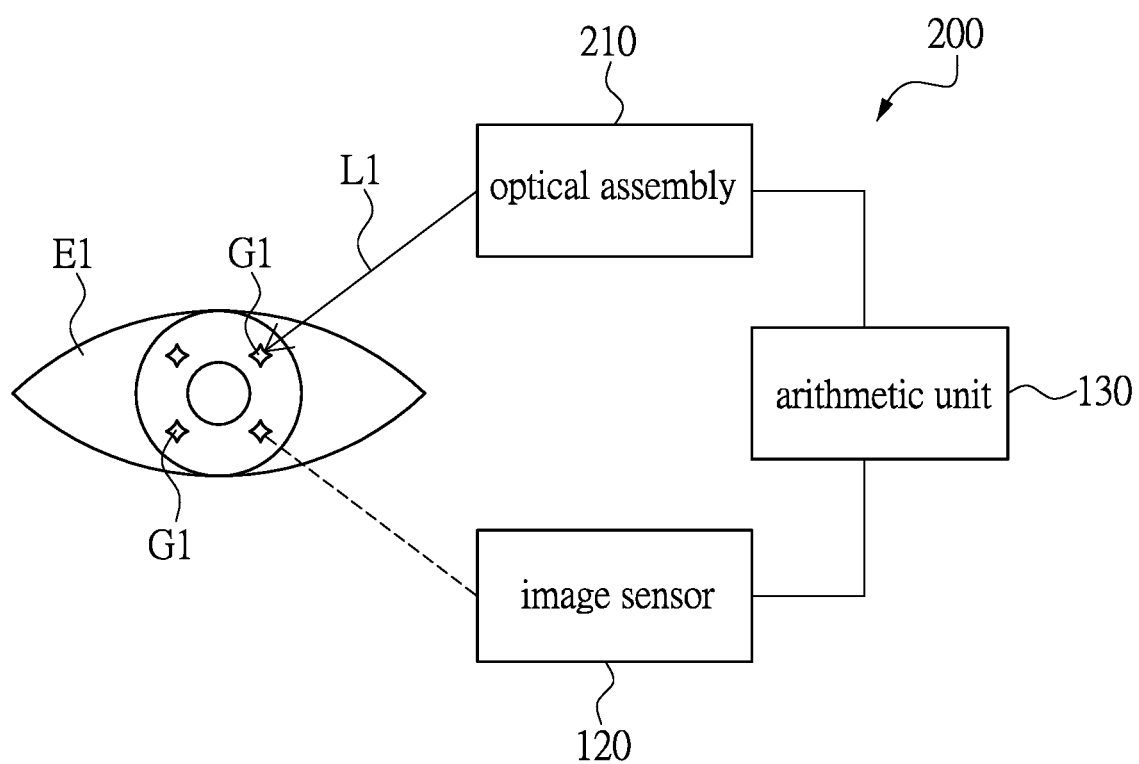
FIG. 2B is a function block diagram of the eye detecting device in accordance with the second embodiment of the present invention.

FIG. 2A is a side view of the eye detecting device in accordance with the second embodiment of the present invention. FIG. 2B is a function block diagram of the eye detecting device in accordance with the second embodiment of the present invention. Please refer to FIGS. 2A and 2B. The structure of an eye detecting device 200 in accordance with second exemplary embodiment is similar to the eye detecting device 100 in accordance with first exemplary embodiment. For example, the eye detecting devices 100 and 200 include the image sensor 120. However, there are some differences between the eye detecting devices 100 and 200. The following detailed description explains the difference between the eye detecting devices 100 and 200, and the same features are basically not described again.

The eye detecting device 200 in accordance with the second embodiment includes an optical assembly 210, an image sensor 120, and an arithmetic unit 130. The optical assembly 210 provides a plurality of incident lights L1 to form a plurality of glints G1 located near a pupil P1 of the eye E1. The image sensor 120 is used to capture an eye image, and the eye image includes these glints G1 image. The arithmetic unit 130 analyzes a gray scale value of the eye E1 image and obtains distribution of the glints G1 according to the gray scale value. Hence, the arithmetic unit 130 determines the position of the pupil P1 of eye E1 according to the distribution of the glints G1.

The optical assembly 210 can emit a plurality of incident lights L1 enter into the eye E1. The incident lights L1 fall on the eye E1 to form a plurality of glints by reflecting at an iris I1 of the eye E1, and at least part of glints are located near a pupil P1 of the eye E1.

In this embodiment, the optical assembly 210 includes only one or less light source 212 and a dispersing component 214. The incident lights can be formed by dividing at least one light through the optical assembly 210. In another embodiment, the optical assembly 210 may include a plurality of light sources 212 and exclude any dispersing component 214. The present disclosure does not limit the number of the light source 212 and the structure of dispersing component 214.

Figure 2C:
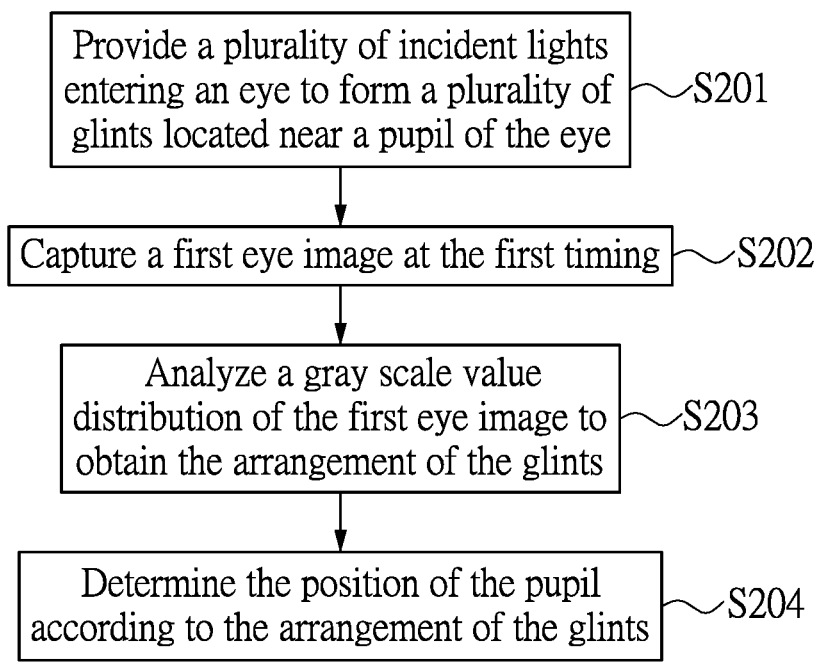
FIG. 2C depicts a flow diagram of a method of detecting pupil in accordance with the second exemplary embodiment of the present disclosure.

FIG. 2C depicts a flow diagram of a method of detecting pupil in accordance with the second exemplary embodiment of the present disclosure. Please refer to FIG. 2A, FIG. 2B and FIG. 2C.

Implementing the step S201, when the user uses the eye detecting device 200, the optical assembly 210 provides a plurality of incident lights L1 to enter the eye E1. The incident lights L1 reflect to form a plurality of glints G1 near the pupil P1, such as the iris I1.

It is worth noticing that the positions of the glints G1 can be changed with the emission positions of the incident lights L1. For instance, there are four emission positions of the incident lights L1 approximately arranged in a rectangle, and the aspect ratio of the rectangle is 2:1. Then, four glints G1 are formed and arranged in a rectangle with the aspect ratio of 2:1.

Implementing the step S202, the image sensor 120 captures a first eye image by photographing the eye E1. The first eye image photographed by image sensor 120 shows the image of the eye E1 region and the image of the said glints G1. Then, the image sensor 120 transmits the data of the first eye image to the arithmetic unit 130.

Implementing the step S203, the arithmetic unit 130 can obtain the arrangement, shape and range of the pixels which each have close to the maximum gray scale value through the gray scale value. Further, the arithmetic unit 130 speculates the arrangement of the pixels corresponding to the arrangement of the glints G1 in the first image.

Implementing the step S204, the arithmetic unit 130 determines the position of the pupil P1 according to the distributions of the glints G1. Specifically, the arithmetic unit 130 selects an appropriate threshold gray scale value first. The gray scale value of the glints G1 in the first eye image are greater than the said threshold gray scale value. After confirming the arrangement of the glints G1, the arithmetic unit 130 scans the survey area M1 near the arrangement of the glints G1 (shown in FIG. 2A), and analyzes the gray scale value distribution of the survey area M1.

It worth mentioning that the survey area M1 can be defined by those glints G1. The survey area M1 contains the arrangement of the glints G1 and the pupil P1, and can be equal to or slightly larger than the area surrounded by the glints G1.

In the same way, in order to reduce the possibility of the misjudgment of the pupil P1 position, after the specific area which has gray scale value less than the threshold gray scale value is determined by the arithmetic unit 130, the arithmetic unit 130 determines whether the shape of the specific area matches the shape of the pupil P1, and the proportion of the specific area is within the range of the pupil P1.

It is worth mentioning that the arithmetic unit 130 can define the shape or range of the survey area M1 through distribution of the glints G1 so as to reduce the seeking range. Hence, the position of the pupil P1 can be searched quickly.

Figure 3A:
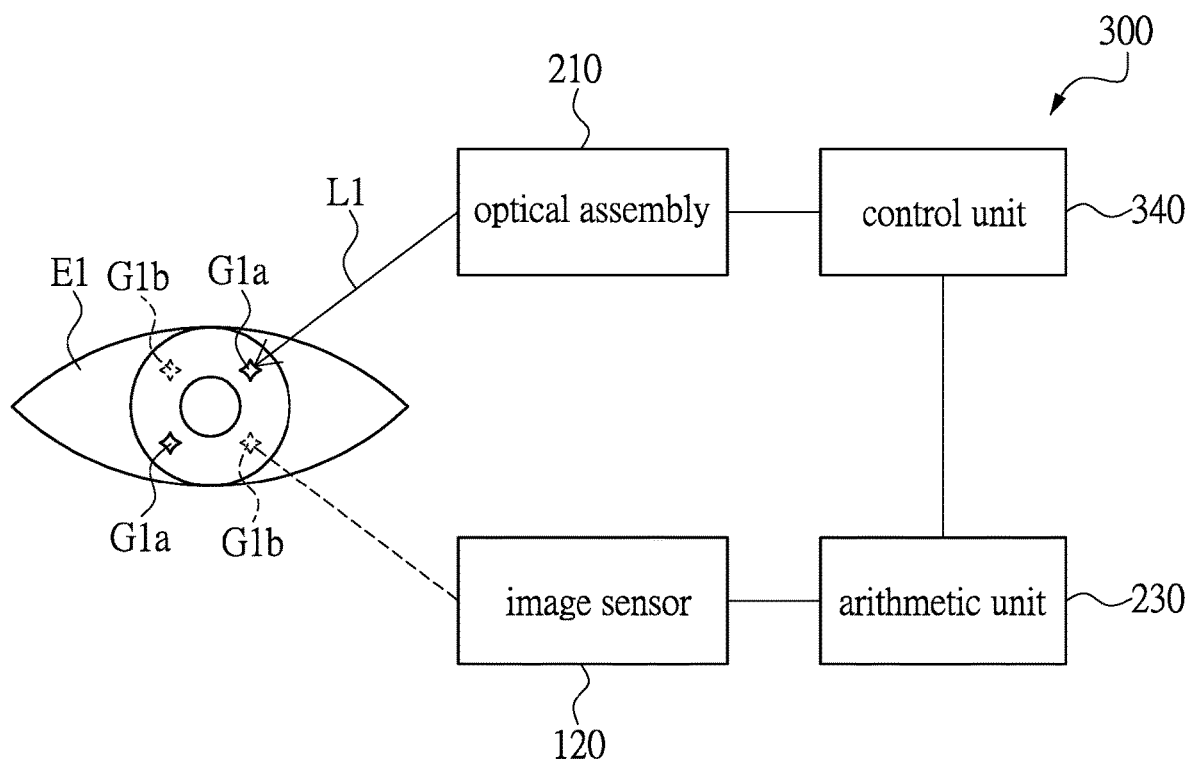
FIG. 3A depicts a function block diagram of the eye detecting device in accordance with the third embodiment of the present invention.

FIG. 3A is a function block diagram of the eye detecting device in accordance with the third embodiment of the present invention. The structure of an eye detecting device 300 in accordance with third exemplary embodiment is similar to the eye detecting device 200 in accordance with second exemplary embodiment. For example, the eye detecting devices 300 and 200 each include the optical assembly 210 and the image sensor 120. However, there are some differences between the eye detecting devices 100 and 200. The following detailed description explains the difference between the eye detecting device 100 and 200, and the same features are basically not described again.

The eye detecting device 300 in accordance with the third embodiment includes an optical assembly 210, an image sensor 120, an arithmetic unit 230, and the control unit 340. The optical assembly 210 provides a plurality of incident lights L1 to form a plurality of glints G1 located near a pupil P1 of the eye E1. The control unit 340 controls the timing that the incident lights are emitted into the eyes, namely, the control unit 340 can control that the optical assembly 210 providing different incident lights L1 into the eyes E1 at different timing separately. The image sensor 120 captures the eye images at different timing, and the eye images include the glint G1a and glint G1b image. Namely, the glint G1a and glint G1b image appear in each eye images captured at different timing. The arithmetic unit 230 analyzes a gray scale value of the eye images captured at different timing and obtains positions of glint G1a and glint G1b according to the gray scale value. Hence, the arithmetic unit 230 determines the position of the pupil P1 of eye E1 according to the position of glint G1a and glint G1b.

Specifically, the image sensor 120 is used to capture the eye images at different timing, and each the eye images shows these glint G1a and glint G1b image. The arithmetic unit 230 analyzes gray scale value of the eye image captured at different timings, in addition, the arithmetic unit 230 commands the control unit 340 so that the control unit 340 controls the timing that the optical assembly 210 provides the incident lights L1.

Figure 3B:
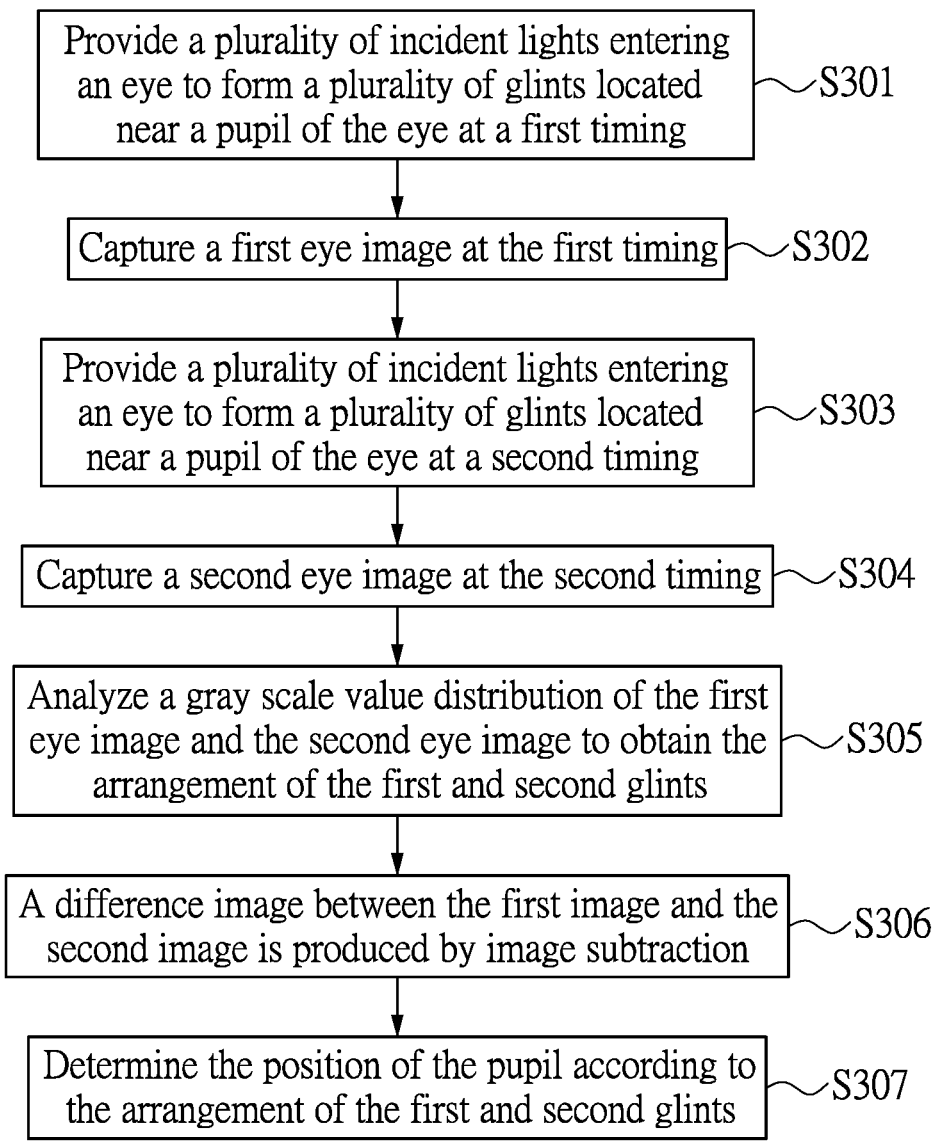
FIG. 3B depicts a flow diagram of a method of detecting pupil in accordance with the second exemplary embodiment of the present disclosure.

FIG. 3B depicts a flow diagram of a method of detecting pupil in accordance with the second exemplary embodiment of the present disclosure. Please refer to FIG. 3A and FIG. 3B.

Implementing the step S301, the control unit 340 controls the optical assembly 210 provides a plurality of incident lights L1 at a first timing. The incident lights L1 enter into the iris I1 area near the pupil P1 and than reflect to form a plurality of first glints G1a. The arrangement of the first glints G1a is corresponding to the emission arrangement of the incident lights L1. It is worth noticing that the optical assembly 210 includes a plurality of light sources without including any dispersing component.

Implementing the step S302, the image sensor 120 captures a first eye image by photographing the eye E1 at the first timing. The first eye image photographed by image sensor 120 at the first timing and shows the image of the eye E1 region and the image of the said first glints G1a. Then, the image sensor 120 transmits the data of the first eye image to the arithmetic unit 230.

Implementing the step S303, the control unit 340 controls the optical assembly 210 and provides a plurality of incident lights L1 at a second timing. The incident lights L1 enter the iris I1 area near the pupil P1 and reflect to form a plurality of second glints G1b. The arrangement of the second glints G1b is corresponding to the emission arrangement of the incident lights L1. It is worth noticing that the first timing is not equal to the second timing, and the arrangement of the first glints G1a formed at the first timing is not equal to the arrangement of the second glints G1b formed at the second timing. Specifically, part of the light source 112 provides some incident lights L1 at the first timing, the other light source 112 provides some incident lights L1 at the second timing.

For example, the amount of the light sources 112 is four, and the light sources 112 are arranged approximately in the rectangular array. The aspect ratio of said rectangular array is 2:1. The control unit 340 controls the optical assembly 210 to provide two light sources 112 arranged in diagonally opposite corners of the rectangular array at the first timing, and then the control unit 340 controls the optical assembly 210 to provide the other light sources 112 arranged in diagonally opposite corners of the rectangular array at the second timing. The present disclosure does not limit the number and arrangement of the light sources 112 provided by the optical assembly 210 at different timings. The present disclosure does not limit the emission sequence of the light sources 112.

Implementing the step S304, the image sensor 120 captures a second eye image by photographing the eye E1 at the second timing. The second eye image photographed by image sensor 120 at the second timing and shows the image of the eye E1 region and the image of the said first glints G1b. Then, the image sensor 120 transmits the data of the second eye image to the arithmetic unit 230.

It is worth noticing that the aforementioned first timing is namely the timing that the user started using the eye detecting device 300, and the second timing is the another timing different from the first timing. The first eye image photographed by image sensor 120 at the first timing, and the second eye image photographed by image sensor 120 at the second timing.

Implementing the step S305, the arithmetic unit 230 analyzes a gray scale value distribution of the first eye image and the second eye image to obtain the distributions of the first glints G1a and the second glints G1b. Specifically, the arithmetic unit 230 can obtain the arrangement, shape and range of the pixels which is close to the maximum gray scale value in all pixels through the gray scale value distribution of the first eye image and the second eye image. Further, the arithmetic unit 130 speculates the arrangement of the pixels corresponding to the arrangement of the first glint G1a in the first image and the second glint G1b in the second image.

Implementing the step S306, a difference image between the first image and the second image is produced by image subtraction. In this embodiment, the amount of the light sources 112 is four, and the first glints G1a in the first image are provided by two light sources 112 arranged in diagonally opposite corners of the rectangular array, and the second glints G1b in the second image are provided by the other light sources 112 arranged in other diagonally opposite corners of the rectangular array. The difference image is generated by subtracting the second image from the first image, and the difference gray scale value of the difference image range from −255 to 255.

Since the arrangement of the first glints G1a and the arrangement of the second glints G1b do not overlap, the gray scale values corresponding to the arrangement of the first glint G1a and the second glint G1b in the difference image between the first image and the second image are proximate to critical value. For example, in the difference image, the gray scale value corresponding to the arrangement of the first glint G1a is proximate to a maximum value, whereas the gray scale value corresponding to the arrangement of the second glints G1b is proximate to a minimum value (negative gray scale value).

Thus, in the difference image, the gray scale value corresponding to the arrangement of the first glint G1a and the second glint G1b show a special pattern. In this embodiment, the special pattern is defined by two brightest spots and two darkest spots. However, in the difference image, the difference image can be generated by subtracting the first image from the second image. Hence, the gray scale value corresponding to the arrangement of the second glint G1b is proximate to a maximum value, whereas the gray scale value corresponding to the arrangement of the first glints G1a is proximate to a minimum value and is not limited to the examples provided herein.

In addition, the arrangement of the first glints G1a and the second glint G1b can be further determined through the arithmetic unit 230. Specifically, in the process of determining the arrangement of the first glints G1a and the second glint G1b through the arithmetic unit 230, the arithmetic unit 230 analyzes the arrangement, shape and range of the pixels which are close to the maximum (255) and minimum (−255) gray scale value in all pixels to speculate a possibility arrangement of the first glints G1a and the second glint G1b. Then, the arithmetic unit 230 speculates whether the possibility arrangement of the first glints G1a and the second glint G1b corresponding to the above-mentioned special pattern.

Since the control unit 340 controls the different incident lights L1 to emit into the different positions of the eye E1 at the different timing, the arrangement of the first glints G1a and the second glint G1b at the different timing can be arranged. The arrangement of the first glints G1a and the second glint G1b can be more confirmed through the gray scale value and the above-mentioned special pattern after image subtraction. Hence, the possibility of the misjudgments of the glints G1 position can be more reduced.

Implementing the step S307, the arithmetic unit 230 determines the position of the pupil P1 according to the arrangement of the first glints G1a and the second glints G1b. Specifically, the arithmetic unit 230 selects an appropriate threshold gray scale value first. The gray scale value of the pupil P1 is less than the said threshold gray scale value, whereas the gray scale values of the first glints G1a and the second glint G1b in the difference image are greater than the said threshold gray scale value. The arithmetic unit 230 confirms the arrangement of the first glints G1a and the second glint G1b through the gray scale value. After confirming the arrangement of the first glints G1a and the second glint G1b, the arithmetic unit 230 scans the survey area M1 near the arrangement of the first glints G1a or the second glint G1b, and analyzes the gray scale value distribution of the survey area M1. The arithmetic unit 230 determines the part of the survey area M1, whose gray scale value is less than the threshold gray scale value.

For example, the gray scale values corresponding to the arrangement of the first glint G1a and the second glint G1b in the difference image are proximate to critical value, and the gray scale value corresponding to the arrangement of the first glint G1a is proximate to a maximum value, whereas the gray scale value corresponding to the arrangement of the second glints G1b is proximate to a minimum value. Thus, the arithmetic unit 230 confirms the arrangement of the first glints G1a through the gray scale value, and then scans the survey area M1 near the arrangement of the first glint G1a to determines the position of the pupil P1.

In particular, the survey area M1 can be defined by these first glints G1a and/or second glints G1b. The range of the survey area M1 contains the arrangement of the first glints G1a and/or second glints G1b, and can be equal to or slightly larger than the area surrounded by the arrangement of the first glints G1a and/or second glints G1b. Specifically, the position of the first glints G1a and/or second glints G1b can be at the boundary of the survey area M1 or in the survey area M1. A user can set the range of the survey area M1 according to the pupil P1 size through the arithmetic unit 230. The present disclosure is not limited to the range of the survey area M1.

The arithmetic unit 230 selects the specific area from the survey area, and the gray scale value of the specific area is less than the threshold gray scale value, and then determines whether the shape and proportion of the specific area matches the pupil P1 in the difference image to reduce the possibility of the misjudgment of the pupil P1 position.

The arithmetic unit 230 can analyze the gray scale value distribution of the survey area M1 near the arrangement of the first glints G1a and/or second glints G1b in the difference image so as to search the position of the pupil P1 quickly. Therefore, compared with conventional technology, the arithmetic unit 230 does not analyze the gray scale value distribution of whole first or second eye image for searching scope of the pupil P1.

Figure 4:
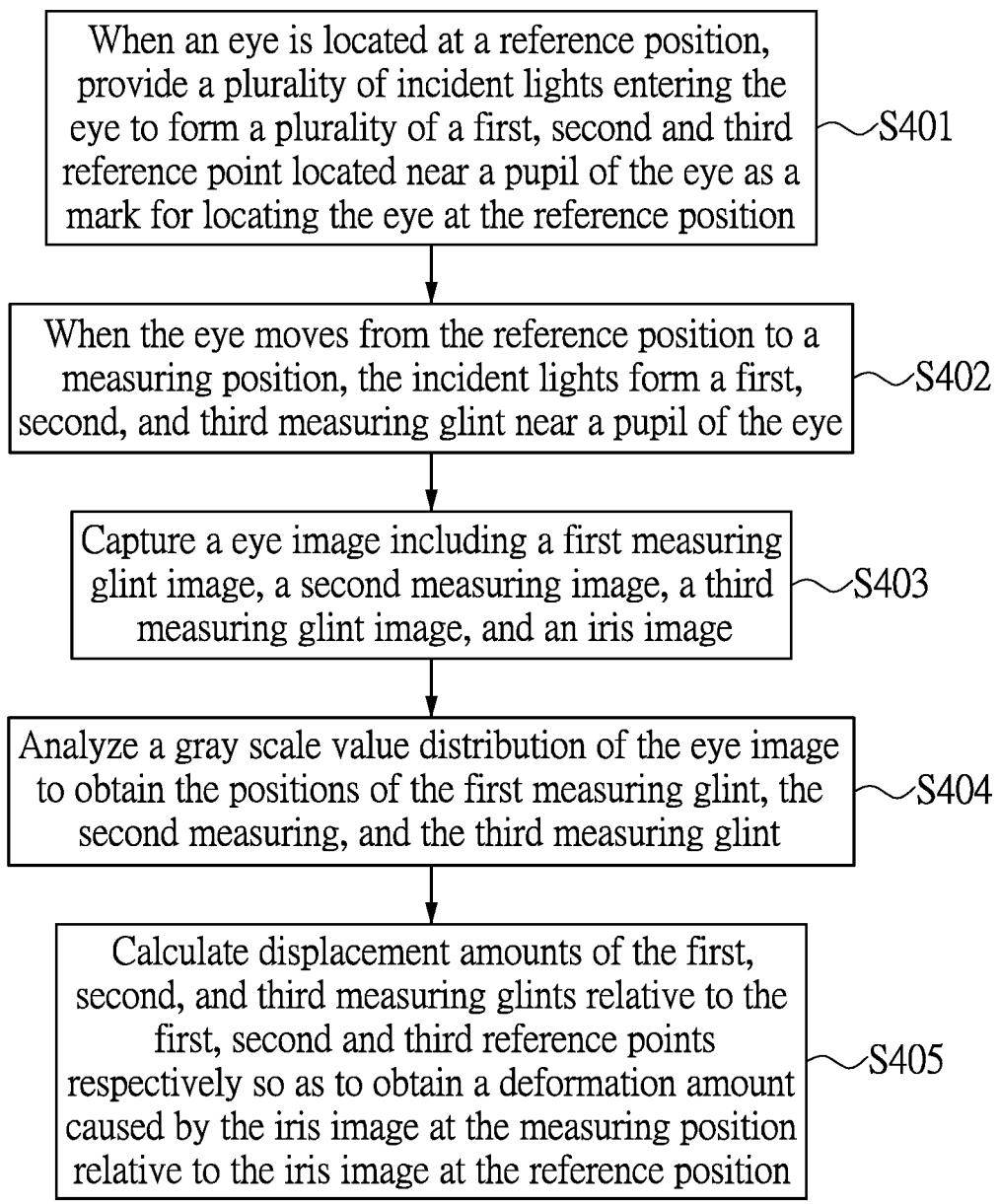
FIG. 4 depicts a flow diagram of a method of identifying iris in accordance with the third exemplary embodiment of the present disclosure.

FIG. 4 depicts a flow diagram of a method of identifying iris in accordance with the third exemplary embodiment of the present disclosure. The method of identifying iris in accordance with the third exemplary embodiment can be implemented through eye detecting device 200 (shown in FIG. 2A). Please refer to FIG. 2A and FIG. 4.

Implementing the step S401, when the eye E1 is located at a reference position, and the reference position is corresponding to a position where the eye gazes straight ahead in this embodiment. The optical assembly 210 provides a plurality of incident lights L1 entering the eye E1. The incident lights L1 reflect to form a plurality of glints G1 near the pupil P1, and the arrangement of those glints G1 is defined to a first reference point, a second reference point and a third reference point.

Specifically, the incident lights L1 can be provided by the light source 212 and the dispersing component 214 so that the emission positions of the incident lights L1 are the illuminated position of the dispersing component 214. Or, the incident lights L1 can be provided by at least three light sources 212 without any dispersing component 214 so that the emission positions of the incident lights L1 are the position where the light sources 212 are placed. The position that the incident lights L1 enter in the iris I1 area near the pupil P1 can be adjusted by adjusting the arrangement of the light source 212 or the disposition of the light sources 212 and the dispersing component 214.

The first reference point, the second reference point and the third reference point are located near a pupil P1 of the eye E1 as a mark for locating the eye E1 at the reference position. The positions of the first reference point, the second reference point and the third reference point are corresponding to the emission position of the incident lights L1. In this embodiment, when the user looks straight ahead, namely, the eye gazes straight ahead, the user presets those glints positions corresponding to the emission arrangement of the incident lights L1 to be regarded as the positions of the first reference point, the second reference point and the third reference point. Specifically, a first reference axis is formed between the first reference point and the second reference point. A second reference axis is formed between the second reference point and the third reference point. A reference angle is formed between the first reference axis and the second reference axis. Besides, in order to mark the reference position clearly, the method of identifying iris can further include presets the fourth reference point or more other reference point, but is not limited to the examples provided herein.

In this embodiment, three emission positions of the incident lights L1 are provided and are arranged approximately as the right angled triangle. The ratio of two sides of said right angled triangle is 2:1. Hence, those glints are located near a pupil P1 of the eye E1 and arranged approximately as the right angled triangle. Namely, the ratio between the first reference axis and the second reference axis is 2:1, and the reference angle is approximate to 90 degrees.

Implementing the step S402, when the eye E1 moves from the reference position to a measuring position, the incident lights L1 form a first measuring glint, a second measuring glint, and a third measuring glint near a pupil P1 of the eye E1. A first axis is formed between the first measuring glint and the second measuring glint. A second axis is formed between the second measuring glint and the third measuring glint. An angle is formed between the first axis and the second axis.

Specifically, the eye E1 is substantially spherical, and the iris I1 is the portion rising slightly above the surface of the sphere. The arrangement of those glints G1 is changed while the eye E1 move s corresponding to the reference position, whereas the glints G1 are the first reference point, the second reference point and the third reference point. Namely, when the eye E1 gaze direction moves from the front direction to lateral direction, the arrangement of those glints G1 is changed from the first reference point, the second reference point and the third reference point to the first measuring glint, the second measuring glint, and the third measuring glint.

Implementing the step S403, the image sensor 120 captures an eye image by photographing the eye E1. The eye image photographed by image sensor 120 shows the image of the eye E1 region and the image of the said first measuring glint, the second measuring glint, and the third measuring glint. Then, the image sensor 120 transmits the data of the eye image to the arithmetic unit 130 or 230.

Implementing the step S404, the arithmetic unit 130 or 230 analyzes a gray scale value distribution of the eye image to obtain the arrangement of the first measuring glint, the second measuring, and the third measuring glint. Specifically, the arithmetic unit 130 or 230 can obtain the arrangement, shape and range of the pixels which is close to the maximum gray scale value (255) in all pixels through the gray scale value distribution of the eye image. Further, the arithmetic unit 130 or 230 speculates the arrangement of the pixels corresponding to the arrangement of the first measuring glint, the second measuring, and the third measuring glint in the image.

Implementing the step S405, the displacement amounts of the first measuring glint, the second measuring glint, and the third measuring glint relative to the first reference point, the second reference point and the third reference point are calculated respectively. Therefore, a deformation amount caused by the iris image of the eye at the measuring position relative to the iris image of the eye at the reference position is obtained. Specifically, the arithmetic unit 130 or 230 calculates the first variation, which is a length and angular variation of the first axis relatives to the first reference axis. The arithmetic unit 130 or 230 calculates the second variation, which is a length and angular variation of the second axis relative to the second reference axis. Equally, the third variation which is an angular variation of the angle relatives to the reference angle is calculated. Hence, the arithmetic unit 130 or 230 calculates the iris image deformation amount according to the first variation, the second variation, and the third variation. Furthermore, the proportion of the iris image deformation amount can be estimated according to the relative proportion of the first axis relatives to the first reference axis and the relative proportion of the second axis relative to the second reference axis. Besides, the distance between the image sensor 120 and eye E1 can be estimated according to the length of the first axis and the second axis. Hence, the size of the pupil P1 can be estimated so that the position of the pupil P1 can be searched quickly.

It is worth to notice that when the user looks straight ahead, the shape of the pupil P1 image photographed by image sensor 120 is similar to a circle. While the measuring position is equal to the reference position, namely, the user keeps looking straight ahead, the shape of the pupil P1 image photographed by image sensor 120 keeps being similar to a circle. While the measuring position is not equal to the reference position, namely, the eye E1 gaze direction moves from the front direction to lateral direction, the shape of the pupil P1 image photographed by image sensor 120 is similar to an ellipse.

The arithmetic unit 130 or 230 can calculate the major axis and minor axis of the said ellipse according to the first variation, the second variation, and the third variation. Hence, the boundary of the pupil P1 can be estimated so that the boundary of the pupil P1 can be searched quickly.

Figure 5:
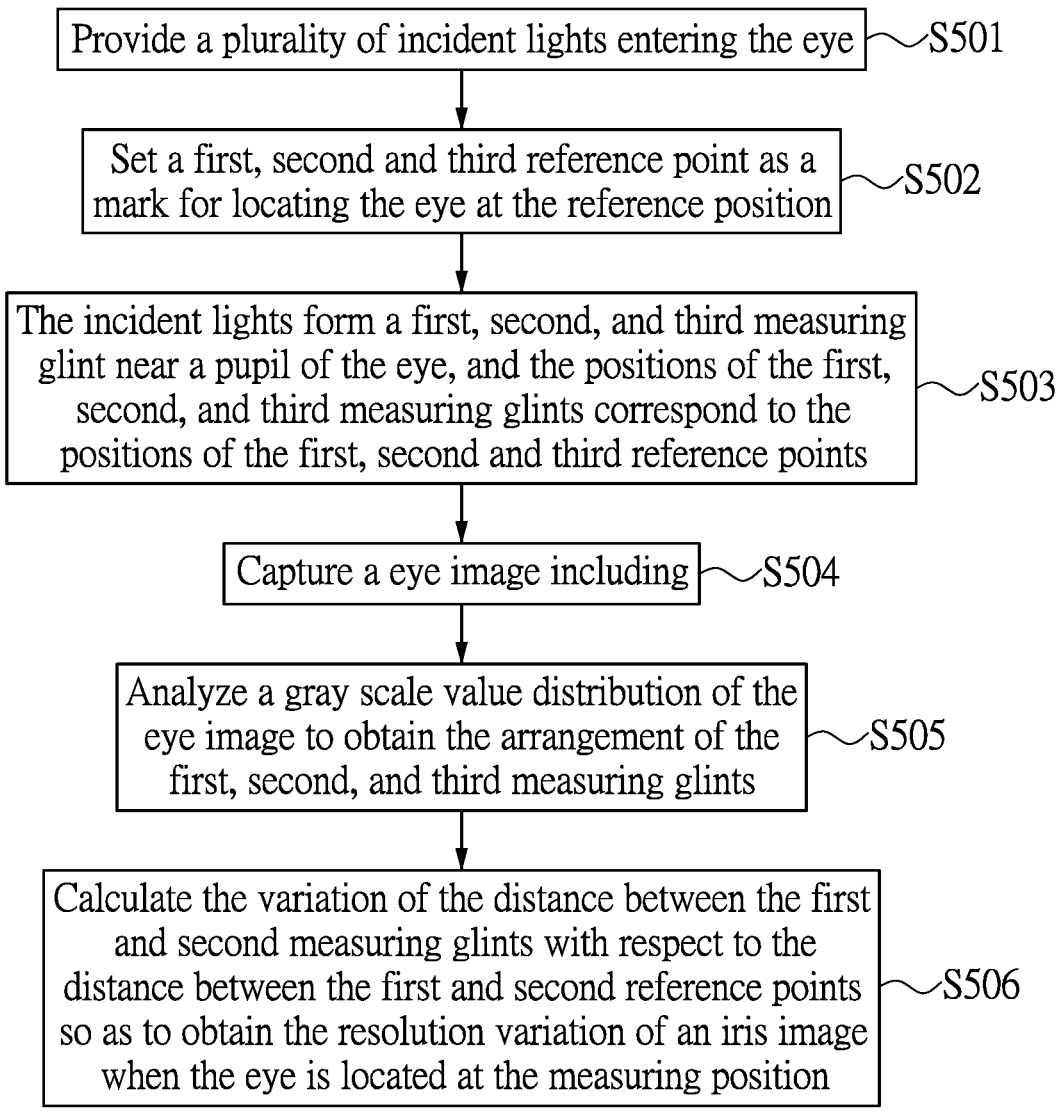
FIG. 5 depicts a flow diagram of a method of identifying iris in accordance with the fourth exemplary embodiment of the present disclosure.

FIG. 5 depicts a flow diagram of a method of identifying an iris in accordance with the fourth exemplary embodiment of the present disclosure. Please refer to FIG. 5 and FIG. 2A. The method of identifying iris shown in FIG. 5 is similar to the method of identifying iris shown in FIG. 4. The differences between these methods of identifying irises are further disclosed as follows.

Implementing the step S501, in this embodiment, the optical assembly 210 provides a plurality of incident lights L1 entering the eye E1. The incident lights L1 reflect to form a plurality of glints G1 near the pupil P1. Specifically, the incident lights L1 can be provided by the light source 212 and the dispersing component 214 so that the emission positions of the incident lights L1 are the illuminated position of the dispersing component 214. Or, the incident lights L1 can be provided by at least three light sources 212 without any dispersing component 214 so that the emission positions of the incident lights L1 are the position where the light sources 212 are placed. The position that the incident lights L1 enter in the iris I1 area near the pupil P1 can be adjusted by adjusting the arrangement of the light source 212 or the disposition of the light sources 212 and the dispersing component 214.

Implementing the step S502, the user sets a first reference point, a second reference point and a third reference point as a mark for locating the eye E1 at the reference position. The positions of the first reference point, the second reference point and the third reference point are corresponding to the emission position of the incident lights L1. In this embodiment, when the user looks straight ahead and there is a reference distance between the optical assembly 210 and the eye E1, the user presets those glints positions corresponding to the emission arrangement of the incident lights L1 to be regarded as the positions of the first reference point, the second reference point and the third reference point. However, the reference position cannot be the position right in front of the eye E1 when the eye E1 gaze direction deviates from the front direction of the eye E1, and is not limited to the examples provided herein.

Specifically, a first reference axis is formed between the first reference point and the second reference point. A second reference axis is formed between the second reference point and the third reference point. A reference angle is formed between the first reference axis and the second reference axis. In addition, in order to mark the reference position clearly, the method of identifying iris can further include presets of the fourth reference point or more other reference points, but is not limited to the examples provided herein.

In this embodiment, three emission positions of the incident lights L1 are provided and are arranged approximately as the right angled triangle. The ratio of two sides of said right angled triangle is 2:1. Hence, those glints are located near a pupil P1 of the eye E1 and arranged approximately as the right angled triangle. Namely, the ratio between the first reference axis and the second reference axis is 2:1, and the reference angle is approximate to 90 degrees. It is worth noting that the user presets those glints positions corresponding to the emission arrangement of the incident lights L1 to be regarded as the positions of the first reference point, the second reference point and the third reference point while there exists the reference distance between the optical assembly 210 and the eye E1.

Implementing the step S503, when the eye E1 is located at a measuring position, there is a measuring distance between the optical assembly 210 and the eye E1. The incident lights L1 form a first measuring glint, a second measuring glint, and a third measuring glint near a pupil P1 of the eye E1. The positions of the first measuring glint, the second measuring glint, and the third measuring glint are corresponding to the positions of the first reference point, the second reference point and the third reference point. A first axis is formed between the first measuring glint and the second measuring glint. A second axis is formed between the second measuring glint and the third measuring glint. An angle is formed between the first axis and the second axis.

Specifically, since different users have different faces and nose heights, there exists different distances between the optical assembly 210 and the eye E1 while different users wear the eye detecting device 200 or 300. Hence, the glint G1 position formed by emitting the incident light L1 into the eye E1 can be changed to the first, second and the third measuring glint. That is, when the eye gaze direction remains without moving, the glint G1 position formed by emitting the incident light L1 into the eye E1 can be changed proportionally from the aforementioned first, second and third reference point to the first, second and the third measuring glint. The angle is equal to the reference angle.

In this embodiment, since the ratio between the first and second reference axis is 2:1, the ratio between the first and second axis is 2:1. Since the reference angle is approximate to 90 degrees, the angle is approximate to 90 degrees.

Implementing the step S504, the image sensor 120 captures an eye image by photographing the eye E1. The eye image photographed by image sensor 120 shows the image of the eye E1 region and the image of the said first, second, and the third measuring glint, and an iris I1 image. Then, the image sensor 120 transmits the data of the eye image to the arithmetic unit 130 or 230.

Implementing the step S505, the arithmetic unit 130 or 230 analyzes a gray scale value distribution of the eye image to obtain the arrangement of the first, second, and third measuring glint. Specifically, the arithmetic unit 130 or 230 can obtain the arrangement, shape and range of the pixels which each have close to the maximum gray scale value (255) through the gray scale value distribution of the eye image. Further, the arithmetic unit 130 or 230 speculates the arrangement of the pixels corresponding to the arrangement of the first, second, and third measuring glint in the image.

Implementing the step S506, the variation of the distance between the first measuring glint and the second measuring glint with respect to the distance between the first reference point and the second reference point is calculated. The variation of the distance between the second measuring glint and the third measuring glint with respect to the distance between the second reference point and the third reference point is calculated. Accordingly, the resolution variation of an iris image when the eye is located at the measuring position is obtained. Specifically, the arithmetic unit 130 or 230 calculates the first variation, which is a length variation of the first axis relative to the first reference axis. The arithmetic unit 130 or 230 calculates the second variation, which is a length variation of the second axis relative to the second reference axis. Hence, the arithmetic unit 130 or 230 calculates the resolution variation of an iris image according to the first and second variation.

For example, the first reference axis has 20 pixels, whereas the second reference axis has 10 pixels. The ratio between pixel of the first and second reference axis is 2:1. The arithmetic unit 130 or 230 calculates that the first axis has 10 pixels and the second axis has 5 pixels. Hence, the arithmetic unit 130 or 230 calculates that the first axis is decreased by two times compared to the first reference axis and the second axis is decreased by two times compared to the second reference axis. Namely, the first and second variation is two. Hence, the boundary of the pupil P1 can be estimated so that the boundary of the pupil P1 can be searched quickly.

In summary, the present disclosure provides eye detecting device, methods of detecting pupil and identifying iris. The eye detecting device includes an optical assembly, an image sensor, and an arithmetic unit. The arithmetic unit can analyze the gray scale value distribution of the survey area near the arrangement of the glint in the first eye image so as to reduce searching scope of the pupil. Hence, the position of the pupil can be searched quickly. Therefore, compared with conventional technology, the arithmetic unit does not analyze the gray scale value distribution of whole first eye image for searching scope of the pupil.

The present disclosure provides an eye detecting device, and methods of detecting a pupil. The eye detecting device includes an optical assembly, an image sensor, an arithmetic unit, and the control unit. Since the control unit controls the different incident lights to emit into the different positions of the eye at different timings, the arrangement of the first and second glint at the different timing can be arranged. The arrangement of the first and second glint can be more confirmed through the gray scale value and the special pattern after image subtraction. Hence, the possibility of the misjudgments of the glints position can be more reduced. The arithmetic unit can analyze the gray scale value distribution of the survey area near the arrangement of the first glints and/or second glints in the difference image so as to search the position of the pupil quickly. Therefore, compared with conventional technology, the arithmetic unit does not analyze the gray scale value distribution of whole first or second eye image for searching the scope of the pupil.

The arithmetic unit can calculate the major axis and minor axis of the said ellipse according to the first variation, the second variation, and the third variation. Hence, the boundary of the pupil P1 can be estimated so that the boundary of the pupil P1 can be searched quickly.

The present disclosure provides methods of identifying an iris. The arithmetic unit can calculate the major axis and minor axis of the said ellipse according to the first, second, and third variation. Hence, the boundary of the pupil can be estimated so that the boundary of the pupil can be searched quickly.

The present disclosure provides methods of identifying an iris. The arithmetic unit can calculate the first, second, and third variation. Hence, the boundary of the pupil can be estimated so that the boundary of the pupil can be searched quickly.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical glasses comprising:
   an eyeglasses frame including two rims;
   an optical assembly disposed on one of the two rims of the eyeglasses frame, wherein the optical assembly has only one light source and a U-shaped light dispersing component with a middle portion and two bending portions, two ends of the middle portion are connected with the two bending portions respectively, a position of the light source corresponds to a position of one of the two bending portions, the U-shaped light dispersing component is configured to provide a plurality of incident light beams with at least three different angles entering an eye to generate a plurality of glints near a pupil of the eye;
   an image sensor configured to capture an eye image including a glint image and a pupil image, wherein the image sensor and the optical assembly are disposed on the same rim; and
   an arithmetic unit configured to analyze a gray scale value of the eye image and obtaining a plurality of positions of the plurality of glints according to the gray scale value, wherein the arithmetic unit determines a position of the pupil of the eye according to the plurality of positions of the plurality of glints.

2. The optical glasses according to claim 1, wherein the plurality of incident light beams are infrared lights.

3. The optical glasses according to claim 1, wherein a gray scale value of the pupil image is smaller than a threshold gray scale value, and a gray scale value of the plurality of glints of the eye image is larger than the threshold gray scale value.

4. The optical glasses according to claim 3, further comprising a control unit, wherein the control unit is configured to control a timing that the plurality of incident light beams are emitted into the eye, and the image sensor is configured to capture the eye image at different timing, and the arithmetic unit is configured to analyze the gray scale value of the eye image at different timing.

5. The optical glasses according to claim 4, wherein the arithmetic unit is configured to command the control unit to control the timing that the incident light beams are emitted into the eye.

* * * * *